United States Patent
Ramakrishnan et al.

(10) Patent No.: US 7,929,527 B2
(45) Date of Patent: Apr. 19, 2011

(54) TRANSPORT PROTOCOL FOR EFFICIENT AGGREGATION OF HETEROGENEOUS LOSSY PATHS

(75) Inventors: Kadangode K. Ramakrishnan, Berkeley Heights, NJ (US); Shivkumar Kalyanaraman, Niskayuna, NY (US); Koushik Kar, Hawthorne, NY (US); Vicky Sharma, Troy, NY (US); Vijaynarayanan Subramanian, Troy, NY (US)

(73) Assignee: AT&T Intellectual Property II, LP

( * ) Notice: Subject to any disclaimer, the term of this patent is extended or adjusted under 35 U.S.C. 154(b) by 124 days.

(21) Appl. No.: 12/148,410

(22) Filed: Apr. 18, 2008

(65) Prior Publication Data

US 2009/0262646 A1 Oct. 22, 2009

(51) Int. Cl.
*H04L 12/56* (2006.01)
(52) U.S. Cl. .................. 370/389; 370/536; 370/542; 714/746
(58) Field of Classification Search .................. None
See application file for complete search history.

(56) References Cited

U.S. PATENT DOCUMENTS

| | | | |
|---|---|---|---|
| 6,947,379 B1* | 9/2005 | Gleichauf et al. | 370/229 |
| 6,975,591 B1* | 12/2005 | Shorey et al. | 370/229 |
| 7,310,670 B1* | 12/2007 | Walbeck et al. | 709/225 |
| 7,372,820 B1* | 5/2008 | Cheung et al. | 370/252 |
| 2003/0002499 A1* | 1/2003 | Cummings et al. | 370/389 |
| 2006/0250949 A1* | 11/2006 | Ramakrishnan et al. | 370/216 |
| 2006/0251010 A1* | 11/2006 | Ramakrishnan et al. | 370/328 |
| 2006/0251011 A1* | 11/2006 | Ramakrishnan et al. | 370/328 |
| 2006/0253763 A1* | 11/2006 | Oliva et al. | 714/746 |

OTHER PUBLICATIONS

Hsieh, Hung-Yun et al; "A Transport Layer Approach for Achieving Aggregate Bandwidths on Multi-homed Mobile Hosts"; Sep. 2002; MOBICOM'02; pp. 83-94.*

* cited by examiner

*Primary Examiner* — Robert C Scheibel
(74) *Attorney, Agent, or Firm* — Henry T. Brendzel

(57) ABSTRACT

A transport protocol that achieves improved performance in an environment where paths are lossy and a plurality of paths are employed to transfer data, essentially in parallel, from a source to a destination. The protocol is implemented with the aid of an aggregate flow manager (AFM) at the source that considers and controls the data flow through the plurality of paths. With some preselected regularity the AFM determines a number of packets to be included in a Forward Error Correction (FEC) block of packets, creates the block, and transmits the segments of the block over the plurality of paths. As necessary, the destination sends information to the source of what additional information needs to be sent. This additional information might be reactive error correcting (RFEC) packets, or a retransmission of the missed packets.

4 Claims, 2 Drawing Sheets

TRANSPORT PROTOCOL FOR EFFICIENT AGGREGATION OF HETEROGENEOUS LOSSY PATHS

BACKGROUND

This invention relates to transport protocols.

It is important for transport protocols to shield applications from the vagaries of wireless multi-hop paths while offering good performance in terms of application-perceived short latency and throughput of errorless, data.

In "Improving TCP Performance in Multipath Packet Forwarding Schemes," Journal of Communications and Networks, Vol. 4, No. 2, June 2002, Lee et al propose simple TCP modifications, and the use of flow-aware routers, to address reordering issues in multi-path transport. They do not consider lossy channels, assuming instead that the underlying paths are reliable. However, Chen et al propose a framework for lossy networks in "Multipath TCP in Lossy Wireless Environment," Proc. IFIP Third Annual Mediterranean Ad Hoc Networking Workshop (Me-Hoc-Net '04), 2004. In the Chen et al approach multiple copies of the same packet are transmitted over different paths, which is fine, except that performance degrades sharply as error-rates increase beyond 20%.

Zhang in "Understanding Internet Routing Anomalies and Building Robust Transport Layer Protocols," PhD. Dissertation, Dept. of Computer Science, Princeton University, September 2005, proposes an mTCP approach, which uses overlay multi-paths to enhance the robustness of end-to-end communications. A subset of the available paths is used in the forward direction such that the selected paths are disjoint to a certain degree. However, mTCP maintains only a single reverse path, so, mTCP does not exploit reverse path diversity and its performance can depend heavily on the choice of the reverse path. Moreover, since no redundancy is introduced at the TCP layer, all lost packets must be retransmitted, resulting in excessive re-transmissions.

Hsieh et al in "A Transport Layer Approach for Achieving Aggregate Bandwidths on Multi-homed Mobile Hosts", *Prod A61 Mobicom* '02, 2002, propose another multi-path TCP scheme, called the pTCP, which manages a group of TCP transports operating on different paths, and allows dynamic remapping of packets to paths in case of congestion/timeouts. This protocol provides separation of congestion control and reliability, since each path can implement its own congestion control scheme. However, pTCP only allows a very limited degree of TCP redundancy, since a packet is transmitted redundantly (over two paths) only if it immediately follows a timeout. Furthermore, it is not clear that the pTCP algorithm provides good performance in highly lossy networks where the source of residual loss is not congestion, and link-layer mechanisms do not suffice.

A receiver-centric adaptation of the pTCP approach, reported by Hsieh et al in "A Receiver-Centric Transport Protocol for Mobile Hosts with Heterogeneous Wireless Interfaces", *Proc. ACM Mobicom* '03, 2003, lets the receiver maintain the congestion window and handle reliability and congestion control. This approach obtains better performance by exploiting the fact that the receiver has more information about the wireless channels and is more capable of handling losses. However, this approach relies on retransmission of lost packets to recover from losses, which can seriously limit its performance advantages in a highly lossy environment.

The above-mentioned prior art publications recognize the potential of multiple paths and consider implementation issues. However, they do not handle multiple highly lossy paths effectively, and may not tolerate a wide range of heterogeneity in path characteristics.

The problem of diversity coding for multi-paths has been modeled theoretically, though the models incorporate only limited protocol adaptivity and/or loss dynamics/path heterogeneity.

Tsirigos et al, in "Analysis if Multipath Routing," *IEEE Transactions on Wireless Communications*, Vol. 3, No. 1, January 2004 (Parts I and II), derive analytical expressions for calculating the delivery probability when packets are over multiple paths (without much delay heterogeneity) based on a simple model of packet failure probabilities on each path and the mapping function of packets to paths. A polynomial time algorithm is provided for computing the optimal mapping, given the failure probabilities on the paths and their correlation.

Vergetis et al, for example in "Realizing the Benefits of User-Level Channel Diversity," *Computer Communications Review*, Vol. 35, No. 5, October 2005, address a similar modeling question, but with a more realistic path (or channel) loss model where loss rates can vary at a faster timescale (on a per packet basis) according to a Markovian model. The benefits of using multiple paths (channels) in improving the packet delivery probability was experimentally evaluated on a 802.11 testbed, but an adaptive transport protocol was not suggested, and only a small number of channels (that differed only in their loss behaviors) were considered.

Miu et al in "Improving Loss Resilience with Multi-radio Diversity in Wireless Networks", *Proc. ACM Mobicom* '05, 2005 consider how better loss resilience can be provided by exploiting multi-path diversity, by combining multiple, possibly erroneous, copies of a given frame, and a low-overhead retransmission scheme. This approach assumes that the channel introduces bit errors rather than packet erasures.

Jain et al in "Exploiting Path Diversity in the Link Layer in Wireless Ad Hoc Networks", *Proc. of the 6th IEEE WoW-MoM Symposium*, Taormina, Italy, June 2005, propose a link-layer mechanism to determine the next hop locally based on prevalent channel conditions. This approach may, however, lead to paths that are dynamically varying and possibly very long, resulting in large variation in the RTT (Round Trip Time) and packet reordering.

Loss-Tolerant TCP (LT-TCP), proposed in Tickoo et al in "LT-TCP: End-to-End Framework to Improve TCP Performance over Networks with Lossy Channels", *Proc. 13th International Workshop on Quality of Service (IEEE IWQoS 2005)*, Passau, Germany, June 200, is a transport protocol designed to be robust in environments with high loss rates and bursty losses. It uses adaptive segmentation, loss estimation and FEC to improve performance, mainly by avoiding expensive timeouts in TCP. LT-TCP uses an estimate of the end-to-end loss rate to provision FEC adaptively through both proactive and reactive mechanisms. However, LT-TCP is designed to operate over a single path and cannot leverage additional capacity and diversity benefits available through use of multi-paths.

To summarize, the problem of scalable aggregation of heterogeneous, lossy paths (whose individual performance characteristics are poor and highly variable) remains unsolved.

SUMMARY OF THE INVENTION

An advance in the art is achieved with a transport protocol that achieves improved performance in an environment where paths are lossy and a plurality of paths are employed to transfer data, essentially in parallel, from a source to a destination. The protocol is implemented with the aid of an aggregate flow manager (AFM) at the source that considers and controls the data flow through the plurality of paths.

Specifically, with some preselected regularity the AFM determines a number of packets to be included in a Forward Error Correction (FEC) block of packets, creates the block, and transmits the segments of the block over the plurality of paths. As necessary, the destination sends information to the source for congestion control and for informing the source of what additional information needs to be sent. This additional information might be reactive error correcting (RFEC) packets, or a retransmission of the missed packets.

DETAILED DESCRIPTION

Figure 1:
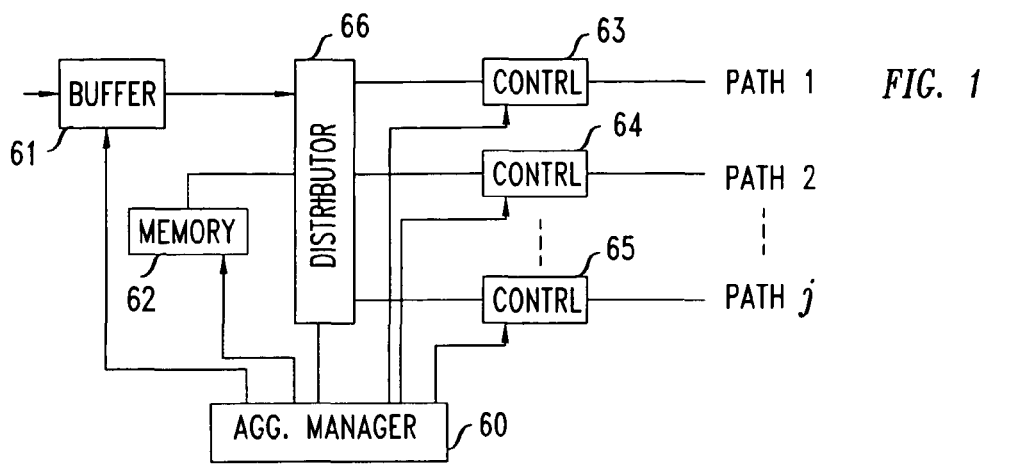
FIG. 1 is a logical block diagram of a source's apparatus.

While a detailed description of TCP (Transmission Control Protocol) is not necessary for this disclosure, a short summary of the data transmission phase of the protocol is believed helpful for those unfamiliar with TCP.

TCP is a protocol for sending packets over an IP network. TCP divides data into TCP segments (packets), with each segment having a sequence number and containing K bytes (in some applications a TCP segment is just one byte of information). The source sends the TCP segments, and the destination returns an acknowledgement for each received segment, which specifies the next sequence number that the destination expects to receive. Of course, there is a time delay before an acknowledgement for the segment arrives, and this delay is a function of the network conditions. To prevent failures that might arise as a consequence of this delay the TCP includes a congestion control mechanism that allows only a certain number, w, of sent TCP segments for which no acknowledgments have arrived. This number is typically referred to as the congestion window. When that number is reached, the source waits for an acknowledgement to arrive before it sends another TCP segment, and it reduces the value of w. Once acknowledgments are received, the window size, w, is increased, but incrementally.

As indicated above, each acknowledgement specifies the next TCP segment sequence number that the destination expects. If the destination does not receive the expected segment, it basically gets stuck at that expected sequence number. That is, as long as segments arrive at the destination—and that continues until the source stops sending segments and all previously transmitted segments pass through the network—the destination sends the same acknowledgement. An acknowledgement that is identical to the immediately previous acknowledgment is, effectively, an Alert Acknowledgment, because it indicates that an expected segment failed to arrive.

This acknowledgement approach is called the cumulative acknowledgment approach.

To illustrate, assume that segments 1 through 5 were received correctly, that segments 6 and 7 were not received, but segment 8 was received. The acknowledgment for segment 5 specifies sequence number 6, and when segment 8 is received the acknowledgement that is sent back still specifies sequence number 6. Unfortunately, the source will receive the second acknowledgement that specifies sequence number 6, i.e., the Alert Acknowledgment only after the return-path transit delay. So, between the time of sending segment 6 and the time of receiving the alert acknowledgment (i.e., the forward-path and the back-path transit delays), the source may have sent 200 segments (7 through 206). If all of those segments are properly received at the destination, then the source with eventually receive 200 Alert Acknowledgments.

Because the acknowledgements in the accumulative acknowledgement approach do not provide a valid indication about the status of segments following the segment that failed to be properly received (lost segment), the best that the source can do when it receives an Alert Acknowledgement is to stop sending new segments, and to assume that the packets that were already transmitted must be retransmitted. In the case of the above example, that means that the source must retransmit TCP segments 6 through 206.

Another acknowledgment approach that is sometimes used in the prior art is the Selective acknowledgment (SACK) approach where, instead of specifying the sequence number of the next expected segment, the acknowledgement specifies ranges of segments that were properly received.

To use the above example, the SACK messages responsive to the first seven received segments are (1,1), (1,2), (1,3), (1,4), (1,5), (1,6), (1,6)(8,8). When the source receives message (1,6)(8,8) it knows that it has to retransmit segment 7, but it does not need to assume that all remaining 200 segments need to be retransmitted as well. In fact, if segments 8 through 48 are received properly, the SACK messages will so indicate by having only two spans specified (assuming that segment 7 was not yet retransmitted, or retransmitted but not yet received), and when segment 49 fails to arrive properly but segment 50 does arrive properly, the next SACK message is (1,6)(8,48)(50,50); i.e., specifying that segments 7 and 49 are missing by means of the three spans.

The protocol disclosed herein is a transport protocol. In particular, the protocol disclosed herein transmits data in block of segments and, advantageously, employs a plurality of paths to transfer data, essentially in parallel, from a source to a destination.

The process flowcharts disclosed below are, in practice, typically executed with a software controlled processor. However, it may be helpful to consider the logical structure of a source, as depicted in FIG. 1 wherein an aggregate flow manager 60 controls (a) buffer 61 that is responsive to data received from the application layer and creates the segments and the blocks of segments, (b) memory 62 that holds error correcting information and, optionally, block segments that have already been sent but which may need to be resent, (c) path controllers 63, 64, and 65 for paths 1, 2, and j, and (d) distributor 66 which applies block segments to the different paths, via the respective controllers, under direction of manager 60.

In the implementation disclosed herein, the blocks are uniform in length, each having N block segments. It is possible to have block segments be bigger than the TCP segments (packets) but it is convenient, at least for exposition purposes, to have block segments and TCP segments be one and the same packets.

The path controllers (63-65) operate in a conventional TCP manner as described above, in the sense that the path i controller sends packets, receives acknowledgements, based on the acknowledgements controls the congestion window, $w_i$, and computes the round trip delay time, $RTT_i$. Illustratively, the acknowledgements are Selective Acknowledgements (SACK). The source knows how many packets are transmitted on each path and combining that information with the SACK information yields the number of packets that are lost on each path. This allows the paths to implement congestion control in the conventional manner.

One feature of the FIG. 1 arrangement is that the acknowledgement messages are sent by the destination over all j paths, concurrently, and the received acknowledgement messages from the different paths are sent to manager 60. Manager 60, in turn, forwards each acknowledgement message to the appropriate path controller. Consequently, the acknowledgement message arrives at the appropriate path controller as quickly as the shortest path permits.

The general thrust of the invention is to use the plurality of paths that are employed for communicating data from a source to a destination in an efficient manner, by using the collection of those paths as a channel with parameters that represent what effectively are the average parameters of the individual paths. In the forward direction—from the source to the destination—significant performance improvement is achieved from this parameters averaging effect. In the backward direction even greater performance improvement is achieved from the fact that the acknowledgement messages are sent concurrently over all of the paths, thus obtaining the benefits of the best (e.g., shortest) path.

As indicated above, at the source data is handled in blocks. More particularly, each block contains data, and additional information that is included in the block to provide a measure of error correcting capability. More specifically, the data of a block consists of k packets, and the additional information consists of N−k Forward Error Correcting (FEC) packets. The size of the block, N, and the number of data packets that it contains, k, are parameters that are dynamically adjusted (as disclosed below) based on the network conditions as they affect the collection of paths that are used, i.e., the channel.

The acknowledgement to a block segment is a block-SACK, and in accord with the principles disclosed herein, a block-SACK is sent by the destination after it receives a first packet of a new block. To simplify the discussion, the following uses the term SACK as shorthand for block-SACK.

In accord with one feature of this disclosures, a SACK message that is sent by the destination after the new block packet is received and processed by the destination is sent concurrently over all of the paths, and the source uses the received SACK message to send additional information so that the destination ends up with all of the transmitted information.

Figure 2:
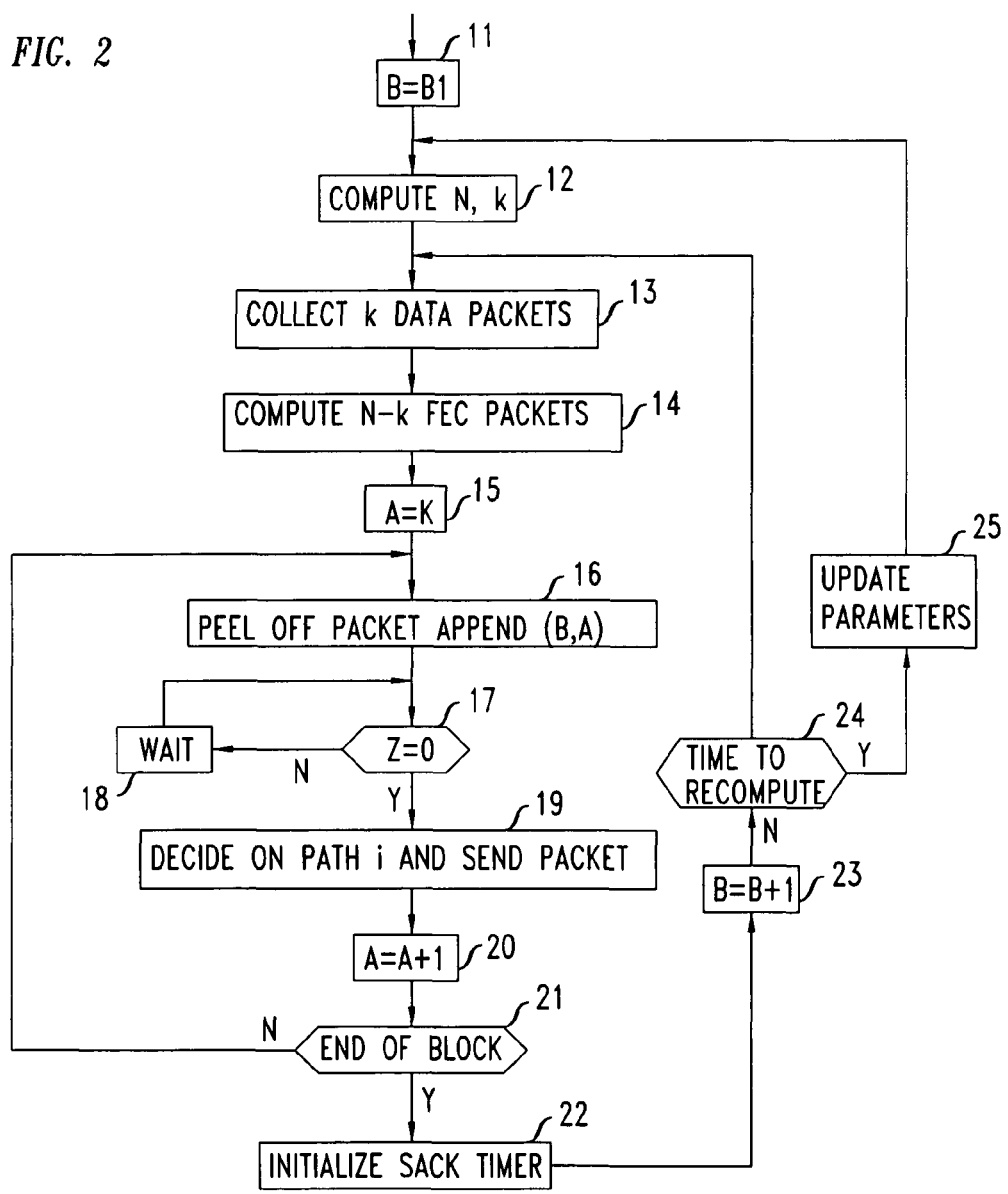
FIGS. 2 and 3 present a flow diagram pertaining to the source.

FIG. 2 depicts an illustrative embodiment flow chart of the process occurring at the source. The process begins at step 11 where an identifier (ID) number is set for a block. Control then passes to step 12 which computes a block size, N, and a number k of data packets, in the manner disclosed below. Initially, when there is no data based on which N and k can be computed, some initial values are taken. Control then passes to step 13, where k new packets are created from data provided by the application layer, and control passes to step 14, where the aforementioned FEC information is computed.

It is noted that the FEC packets that are included in the block are not the only error correcting information that may be necessary. In spite of having FEC packets included in the block it is possible that transmission errors will occur in excess of the ability to mask them by use of the FEC packets. This fact is actually implicit in the fact that SACK messages are employed. . In the illustrative embodiment disclosed herein in connection with FIG. 2, this additional information is additional FEC packets (that at times might be used—as disclosed below). To distinguish between the FEC packets that are initially included in a block, and the other FEC packets, the former are termed proactive FEC packets, or PFEC packets, and the latter are termed reactive FEC packets, or RFEC packets.

Returning to FIG. 2, in step 14 computes both the PFEC packets and the RFEC packets are computed for the block, and the PFEC packets are appended to the block. Control then passes to step 15 to initialize sequence index A, and then to step 16, which peels off a packet from the block, and appends to it the block ID and the sequence number A in preparation for transmission. Control then passes to step 17, which determines whether flag Z=0, which indicates that the packet is permitted to be transmitted. If not, control passes to step 18, which imposes a wait period before returning control to step 17. When Z=0 control passes to step 19 where a path, i, is chosen and the subject packet is sent to the destination over path i. The sequence number, A, is then incremented in step 20 and a test is performed in step 21 to determine whether the sent packet is the last packet of the block. When the end of the block has not been reached, control returns to step 16. Otherwise, control passes to step 22, which initiates a timer for receiving and handling a SACK message. From step 22, control passes to step 23 where the block ID number is incremented, and then to step 24, where a determination is made as to whether to update the channel parameters and recompute the values of N and k. If so, control passes to step 25 where the parameters are recomputed, and then control passes to step 12. Otherwise, control passes to step 13.

Relative to step 17 where it is determined whether there is permission to send the segments of the current block, it is possible that there is no permission to send a block's packet because the source is busy transmitting information to augment that which was sent before but not properly received. This may be a retransmission of packets, or the transmission of RFEC packets. In such an event, as explained below in connection with FIG. 3, when the source finishes sending the augmenting information, permission to send new packets is granted. It is also possible that there is no permission to send a block's packet because the network is congested. This condition as evidenced, for example, by the failure to receive a SACK message within an expected time interval. This, too, is handled in the FIG. 3 flowchart.

Figure 3:
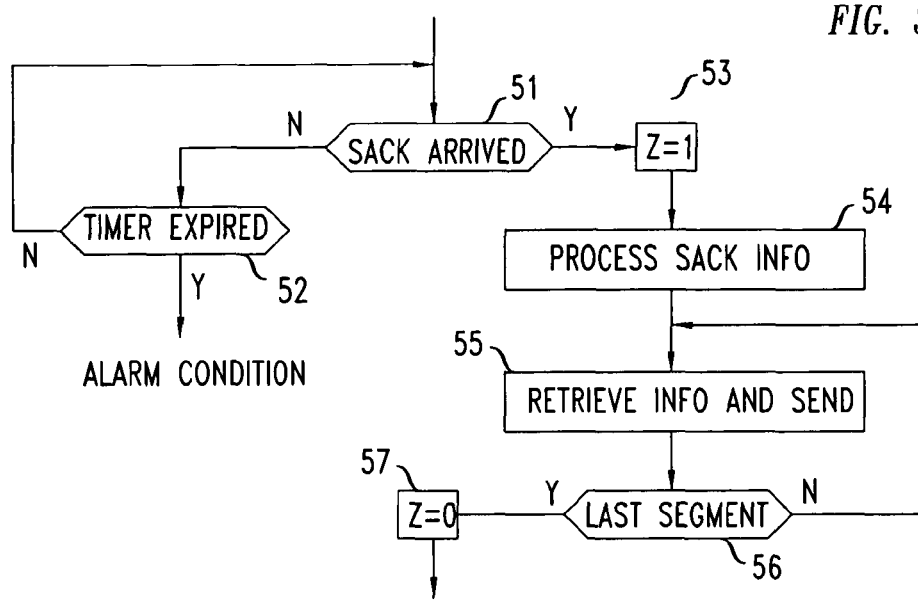

The FIG. 3 flowchart begins with step 51 that determines whether a SACK message has arrived. If so, control passes to step 53. Otherwise, control passes to step 56, which checks whether the timer (initialized by step 22) has expired. If not, control returns to step 51. Otherwise, an alarm condition is declared.

It is noted that the event of a SACK message not arriving before the timer expires is handled in the same manner that it is handled in the prior art TCP protocol, and it is not addressed here.

Step 53 sets flag Z to 1, indicating that transmission of block packets is arrested (in step 17). Control then passes to step 54, which processes the SACK information and determines what needs to be sent. Illustratively, when the block was sent with a number of PFEC packets that can recover f failed packets (i.e., packets that were not received properly) but the block arrived with f+g failed packets, none of the failed packets can be recovered and the SACK message informs the source of this condition. If the source has g RFEC packets already computed, it is generally preferable to send the g RFEC packets. If however, the source has fewer than g RFEC packets computed, it is generally preferable to simply resend the f+g failed packets.

From step 54 control passes to step 55 which retrieves and sends the needed information. Specifically, step 55 accesses the appropriate buffer to obtain a packet of the information that needs to be sent, augments the packet by appending to it a header, and sends the augmented packet. Following step 55, step 56 determines whether the packet sent is the last packet for the information that needs to be sent in response to the received SACK message, and if not, the step returns control to step 55. Otherwise, control passes to step 57, which resets flag Z to 0.

As indicated above, the information that step 55 sends is either data packets (a retransmission of packets that were not received properly), or RFEC packets. In the case of data packets, the packets' header (pertaining to this protocol) is simply the block ID number and the sequence number of the retransmitted packet. In the case of RFEC packets, the header is the block ID number and a sequence starting with A=0.

It should be noted that in FIG. 2 the sequence numbers of a block's data packets and PFEC packets begin with K. K is arranged to be greater than the maximum number of RFEC packets that the source will ever send. This way, the destination knows that it is receiving RFEC packets rather than a retransmission of data packets.

At the destination end, a SACK message is sent to the source after each packet has been received.

The question, however, is how, given that there is a plurality of paths that the source employs, the destination knows that it should wait no longer for another packet of some given block B. One illustrative embodiment has the destination simply wait till a packet from block B+1 is received from all of the paths. This guarantees that there are no packets of block B still in transit. Another embodiment employs a histogram of past receptions to identify the path with shortest and the longest delays, respectively, from which the approximate time difference between them, $\delta$ seconds, is computed. Armed with this information, the destination knows that certainly $\delta$ seconds after a packet of block B+1 arrives, it is assured that no packets of block B are still in transit. This is the embodiment depicted in FIG. 3.

Figure 4:
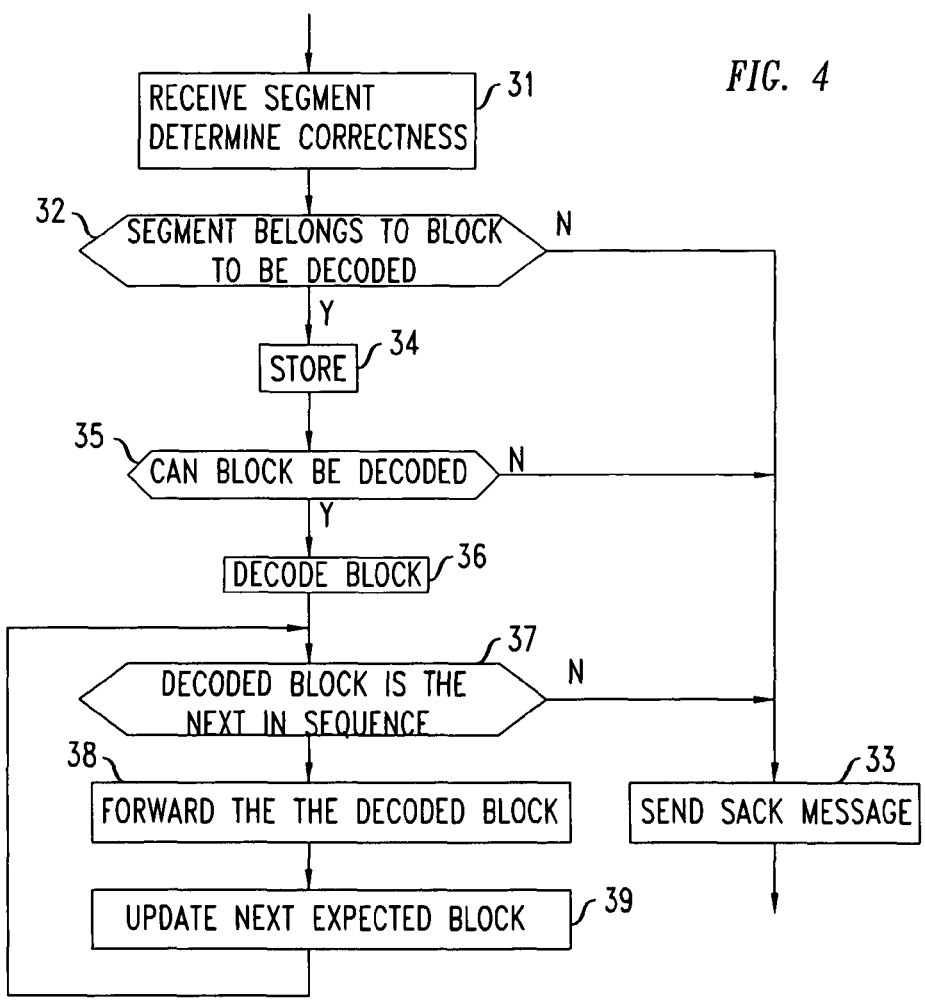
FIG. 4 presents a flow diagram pertaining to the destination.

FIG. 4 illustrates the process of receiving packets at the destination. The destination receives a packet in step 31 and determines whether it received the segment correctly. When it determines that the received packet is not correct, the packet is simply discarded. When the received packet is correct, control passes to step 32 which determines whether the packet belongs to a block that is still in need of packets. If not, control passes to step 33, which sends a SACK message to the source that a packet was received (albeit was not needed). When the received packet is needed for decoding a block, control passes to step 34, which stores the packet in a buffer and passes control to step 35 which determines whether, relative to the block of the packet that just arrived, there are enough packets in store to decode the block. If not, control passes to step 33 again, which sends a SACK message to the source to inform it that a packet arrived. If there are enough packets to decode the block, control passes to step 36 where the block is decoded, whereupon control passes to step 37.

The buffer might contain packets of more than one block, and it is possible that while block n is in buffer and still needs information in order to have a sufficient number of packets for decoding, while the arriving packet belongs to block n+1 and it is one that allows the decoding of block n+1. It is preferable to not send the decoded block n+1 to the application layer before block n is sent and, therefore, step 37 determines whether the just-decoded block is the next expected block to be decoded. If not, control passes to step 33 once again to send a SACK message to the source. If it is the expected block that was successfully decoded then control passes to step 38 which forwards the decoded block to the application layer and passes control to step 39. Step 39 updates the next expected block (e.g., increments from n to n+1) and return control to step 37. When there is no next block in connection with which step 37 can determine whether the decoded block is the next block in the next block in the sequence control also is passed to step 33 to send a SACK message to the source.

The consequence of block processing is that either the block is valid and ready to be decoded, or not; and in the latter case process 35 constructs a SACK message. Illustratively, the SACK message is of the form $$[(A_1,A_2)(A_3,A_4) \ldots R_1(B), \ldots R_2(B) \ldots R_i(B) \ldots R_j \ldots (B)],$$

where each $A_i$ is a sequence number that marks the beginning or the end of a span of successfully received packets, and each $R_i(b)$ corresponds to the number of packets that were received via path i for block B (there are j such paths). For example, when a block has 1000 packets, 4 paths, and three packets were not properly received, the SACK message might be $$[(1,302)(304,825)(827,998)(1000,1000), 240, 255, 250, 247],$$

indicating that packets 303, 826, and 999 are missing (i.e., did not arrive, or arrived but are corrupted), and that the 4 paths carried 240, 255, 250 and 247 packets, respectively.

As indicated above, one interesting feature of this embodiment is that the SACK message is sent to the source concurrently over all of the paths. Consequently, the SACK message arrives at the source as quickly as the shortest path permits.

Processing (i.e., decoding) of the packets in a block that includes PFEC packets can be performed in any of a number of well known ways that relate to the selected process for creating the PFEC (and RFEC) packets.

It may be noted in passing that the process of sending a SACK message to the source with each packet that is received and accepted as a good packet in step 31 not only provides for congestion control at the source, but it is also able to inform the source even before the entire block was transmitted that RFEC packets ought to be sent.

Regarding the process of steps 25 and 12 (FIG. 1), as indicated above, each of the path controllers computes the round trip time, $RTT_i$, for the path. The manager 60 thus has access to this $RTT_i$ information, and to the congestion window values, $w_i$. From the SACK message the manager 60 knows how many packets were received via each path i, $R_i(B)$, and it knows how many packets it sent over each path i, $S_i(B)$. This information is provided to step 12, from which the median round trip time $RTT_{med}$ is derived, and the value of N is computed in step 12 by evaluating $$N = \sum_{i=1}^{j} \frac{RTT_{med}}{RTT_i} w_i.$$

From the available information the source can also determine an aggregate loss for the channel by evaluating $$1 - r_{agg} = \frac{\sum_{i=1}^{j} R_i(b)}{\sum_{i=1}^{j} S_i(b)},$$

a window average by evaluating $$\bar{r}_{agg}=(1-\lambda)\bar{r}_{agg}+\lambda r_{agg},$$

where λ is, for example, the constant 0.5, an instantaneous variance by evaluating $$\sigma_{inst}^2=(r_{agg}-\bar{r}_{agg})^2,$$

and an aggregate variance from $$\sigma_{agg}^2=(1-\lambda)\sigma_{inst}^2+\lambda\sigma_{inst}^2.$$

From those parameters, step 12 computes the value of k by evaluating $$k=(1-\bar{r}_{agg}-\sigma_{agg})N.$$

The test performed in step 24 regarding whether it is time to recompute the parameters is a designer choice. It can be as simple as a preselected number of blocks. For example, each time the value of B is a multiple of 10, step 24 passes control to step 25.

Step 19 chooses a path i for transmitting a packets. This choice can be made based on any algorithm, such the round robin scheduling algorithm. However, it is recognized that some paths may offer lower error probabilities than others and, therefore, may be considered better. This is particularly so if those paths also have shorter transit times. In the context of the above-disclosed protocol, when the block of packets is sent over the channel, there may be some advantage for favoring the better paths, particularly in situations where there is a large disparity between the goodness of one paths and some other of the paths. For better performance, the selection algorithm may be made stochastic, with the probability of selecting a path being proportional to a measure of goodness of the path, which measure might take account of only the probabilities of error, or take account of probabilities of error and transit delay.

As an aside, the probability of error of a path i may be computed following each SACK message reception by evaluating $$pr_i(\text{new}) = \frac{1}{1-\lambda}\left[\left(1-\frac{R_i(B)}{S_i(B)}\right)+\lambda pr_i(\text{existing})\right]$$

where λ is a preselected constant that is less than 1, $R_i(B)$ is the number of packets received by the destination over path i for block B (and sent to the source in the SACK message), $S_i(B)$ is the number of packets sent by the source over path i for block B, and $pr_i$(existing) is the probability of error that had been previously computed for path i.

Generally, however, the overall performance of the protocol is not enhanced so much by employing a stochastic path selection approach for the transmission of a block's packets. A more significant performance enhancement is realized, however, when distinguishing between the transmission of a block's packets vs. the transmission of RFEC packets, or the retransmission of failed packets. That is, it is beneficial, when sending the RFEC packets or retransmitting failed packets to employ the paths that have a low probability of error. Here, too, however, experimental results indicate that it suffices to classify paths into two groups; one being the "standard" group and the other being the "good" group. The paths belonging to the "good" group are used for transmitting the RFEC packets, or packets need to be retransmitted.

The invention claimed is:

1. A method for sending information to a destination, employing M different paths, comprising the steps of:
   at a source apparatus
     collecting k data segments from incoming information, where k<N and N is the size of a block;
     computing N−k proactive forward error correcting (PFEC) segments for said k data segments and g reactive forward error correcting (RFEC) segments, where g is a chosen integer;
     forming an N-segment block by combining said k data segments and said N−k PFEC segments;
     employing a congestion control element with each of said M paths;
     applying each of the N segments of said block to a chosen one of said congestion control elements for transmission over a path associated with the chosen congestion control element, where the chosen congestion control element is selected based on a probabilistic algorithm involving a measure of goodness that is evaluated for each of said M paths
   at said destination
     sending, over each of said M paths, a selective acknowledgement (SACK) message following reception of each segment;
   at said source apparatus
     from identical SACK messages arriving from said M paths relative to each received segment, accepting the first-arriving SACK message;
     distributing said accepted SACK message to all of said congestion control elements;
     when an accepted SACK message relative to one of the received segments indicates a need for m specific segments of said block, forming a secondary block of (a) said m specific segments of said block when m is greater than g, or (b) m of said RFEC segments when m is not greater than g, and transmitting the segments in said secondary block over a subset of said M paths, where said measure of goodness of said paths in said subset is greater than the measure of goodness of paths not in said subset; and
     returning to said step of collecting.

2. The method of claim 1 where said step of returning includes the steps of:
   determining, with preselected regularity, whether to recompute and correspondingly alter the value of k, or of N, and
   altering said value when said determining so indicates.

3. The method of claim 2 where said probabilistic algorithm depends (a) only on probability of error on said path or (b) on probability of error on said path and transit delay via said path.

4. The method of claim 1 where said preselected algorithm for selecting a path favors paths with a higher value of a chosen measure of goodness.

* * * * *